March 10, 1970 V. F. DAHLGREN ET AL 3,499,218

MULTILAYER CIRCUIT BOARDS AND METHODS OF MAKING THE SAME

Filed Oct. 31, 1966

INVENTORS:
VICTOR F. DAHLGREN
SIDNEY K. TALLY
THOMAS H. STEARNS
BY
Brumbaugh, Free, Graves & Donohue
ATTORNEYS

United States Patent Office 3,499,218

Patented Mar. 10, 1970

3,499,218

MULTILAYER CIRCUIT BOARDS AND METHODS OF MAKING THE SAME

Victor F. Dahlgren, Chelmsford, Mass., and Sidney K. Tally, Nashua, and Thomas H. Stearns, Amherst, N.H., assignors to Electro-Mechanisms, Inc., Methuen, Mass., a corporation of New Hampshire Filed Oct. 31, 1966, Ser. No. 590,677

Int. Cl. H05k *3/30*

U.S. Cl. 29—624 2 Claims

ABSTRACT OF THE DISCLOSURE

As described herein, a printed circuit is made by laminating together one or more layers of conductors mounted on insulating media. To the outermost exposed layers of conductors is applied a sheet of insulating material having strips of metal imbedded in its surface adjacent to the printed circuit and overlying the portions of the printed circuit to which other circuits are to be connected. The sheet of insulating material is then laminated to the printed circuit and, thereafter, the strips of metal are stripped from the laminated product to remove the insulating material overlying the strips and expose the portions of the printed circuit which were behind the metal strips.

This invention relates to improvements in printed and miniature electrical circuits, and methods of making such circuits, and more particularly to methods of making electrical connections in printed and miniature circuits.

Many techniques have been used heretofore in making electrical connections between printed and electrical or electronic components or "hardware," including soldering, "plating through," brazing and the like. Most of these techniques can be used where space permits, but in many of the printed and miniature circuits now being produced, the connection pads are too closely spaced and too small to enable the use of conventional soldering, brazing or electroplating equipment. This problem is made more difficult by reason of the need for insulating coverings over those portions of the circuits to which connections are not to be made and the close proximity of the insulation to the uninsulated portions of the circuits where connections are to be made.

In accordance with the present invention, methods are provided whereby connections can be made between electrical components, such as resistances, capacitors, transistors, modules containing a plurality of such electrical components and printed circuits or miniature circuits encapsulated in insulating materials without damage to the component circuits or insulation.

More particularly, a method is provided whereby the conductors or connecting pads of insulated printed or miniature circuits can be bared to enable electrical components to be brazed thereto by application of welding current thereto with welding electrodes of suitable type.

In accordance with the invention, a printed or miniature circuit is made by laminating one or more layers of conductors mounted on insulating media. An outermost layer of conductors is exposed, i.e., not covered by a layer of insulation. To the outermost, exposed layer of conductors is applied a sheet of insulating material, e.g., a layer of a thermoplastic resin having strips of tough metal or the like, such as strips of copper embedded in its surface adjacent to the printed circuit and overlying the portions of the printed circuit to which other circuits or electrical components are to be connected. The sheet of insulating material is then laminated to the printed circuit, e.g., by means of pressure or heat and pressure, with or without an adhesive. After lamination, the strips of metal are peeled or stripped from the laminated product, thereby also removing the insulating material overlying the strips and baring those portions of the outermost layer of the printed circuit which were behind the metal strips so that connections can be made thereby by silver brazing or the like.

To facilitate brazing, it may be desirable to provide conductors on the electrical components or "hardware" with coatings of silver brazing alloys or terminal portions having silver brazing alloys thereon having melting points of at least 800° F. (usually 1100° F. to 1400° F.). This is especially advantageous with components which are normally provided with Kovar conductors or terminals. Kovar is an alloy composed of about 29% nickel, 17% cobalt, and the remainder iron, and is widely used in the electronic field because of its coefficient of expansion and weldability. However, Kovar is difficult to solder or silver-braze and, moreover, it has a different thermal coefficient of expansion from copper and tin-alloy solders and has a tendency to break a weak soldered joint on cooling.

In accordance with the invention, a bimetallic conductor composed of a strip of copper having a layer of silver or silver brazing alloy can be brazed or strongly soldered to the Kovar terminal and the bimetallic strip is then brazed to the printed circuit pads or terminals assuring a strong and durable electrical connection therewith.

The conductors in the various layers of stacked printed circuits can be connected in any suitable manner, such as, for example as shown in our U.S. Patent No. 3,264,524 dated Aug. 2, 1966, and our copending application Ser. No. 470,685 filed July 9, 1965.

In making the connections between the bared portions of the outermost layer of conductors and the electrical components, parallel gap welding apparatus has been found suitable. A parallel gap welding device includes electrodes having a pair of very closely spaced, substantially parallel, small diameter electrodes which upon contact with the uppermost or outermost terminal to be welded and passage of a short pulse of current therethrough heats the conductor terminal and the underlying printed circuit terminal causing the silver brazing alloy therebetween or a surface coating on one or both of them to fuse and weld the terminal and the component together providing a pronounced fillet which can be examined by means of a microscope to determine whether the braze is strong and uniform. By using parallel gap welding, brazes can be made of terminals in very closely spaced relation in miniaturized circuits while at the same time assuring mechanically strong and highly electrically conductive joints.

For a better understanding of the present invention, reference may be had to the accompanying drawings, in which.

Figure 1:
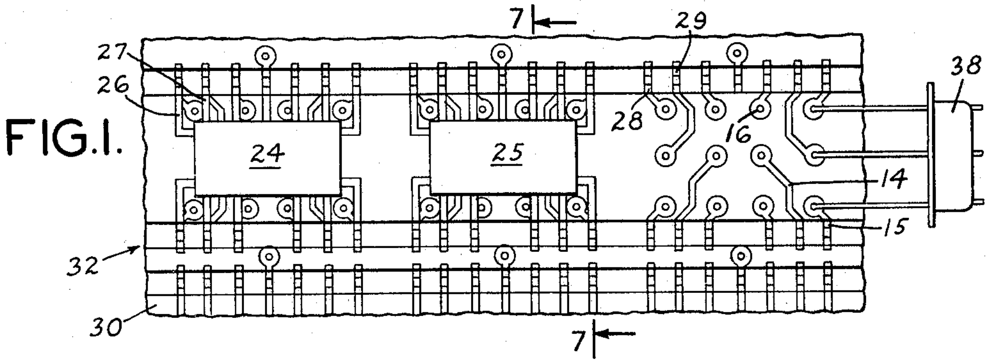
FIGURE 1 is a plan view of a miniaturized electrical circuit shown greatly enlarged.
Figure 2:
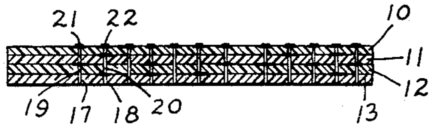
FIGURE 2 is a cross-sectional view of the circuit in a partially completed condition.

Referring now to FIGURES 1 and 2, an illustrative embodiment of the invention comprises a typical stacked printed circuit, including a plurality of layers of insulating media 10, 11, 12 and 13 which by way of example, may consist of resin-impregnated woven glass fibers, the resin being any of the thermoplastic or thermosetting resins used in the electronics field, such as, for example, epoxy resins, polyurethane resins and the like. On a surface of each of the layers 10, 11, 12 and 13 is formed a printed circuit, such as a circuit composed of a series of conductors 14, 15, 16 and so forth, shown at the right hand end of FIGURE 1, and formed in any suitable way, such as, for example, by electrodepositing copper on the insulating layer, applying a resist by means of a silk screen process or the like, and then etching away a portion of the copper sheet which is not covered by the resist material. After etching, the resist material is removed and the various printed circuits are assembled as shown in FIGURE 2 and laminated together by means of heat and pressure or by means of a pressure and an interposed adhesive or a combination of heat, pressure and adhesive, all of these techniques being well known in the art.

Figure 3:
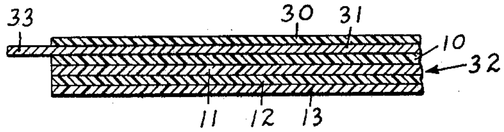
FIGURE 3 is a cross-sectional view of the circuit including an overlying layer of insulation and interposed tear strip therebetween.
Figures 4, 8:
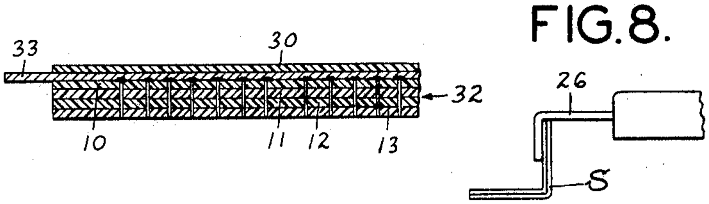
FIGURE 4 is a cross-sectional view thereof after lamination of the outermost insulated layer to the circuit.
FIGURE 8 is a side elevational view of a portion of the module showing a bimetallic terminal portion attached thereto.

In order to make suitable interconnections between the circuits on the layers 10, 11, 12 and 13, holes 17, 18 and so forth are drilled at appropriate places through the laminated printed circuit assembly, and pins or tubelets coated with a silver-brazing alloy are inserted in the holes and brazed to the printed circuits at the zones of contact with the pins or tubelets, as taught more particularly in our U.S. Patent No. 3,264,524 and our U.S. application Ser. No. 470,685 filed July 9, 1965. The connecting pins 19, 20 and so forth may have heads or flanges 21 and 22 exposed above the printed circuit carried by the layer 10 and below the layer 13, or they may be substantially flush therewith, as desired. In any event, the stacked circuit has the necessary interconnections therein and can be connected with other electrical components such as the modules 24 and 25 shown in FIGURE 1. Each module may include a plurality of electrical components and is provided with a plurality of terminals 26, 27 and so forth which are to be connected to corresponding terminals 28, 29 and so forth of the uppermost printed circuit 14, 15, 16. Inasmuch as the entire surface areas of the printed circuit conductors 14, 15, 16 are exposed on the upper surface of the outermost layer 10, it is desirable to apply an insulating medium to all of those portions of the conductors except the portions at which electrical connections are to be made with the module or other component. To that end, as shown in FIGURE 3, a layer of an insulating plastic 30, carrying on its undersurface a plurality of thin metal strips 31 adapted to overlie the portions of the circuits where electrical connections are to be made, is superimposed on the stacked circuit 32 composed of the layers 10, 11, 12 and 13, and is laminated to the stacked circuit so that the upper circuit conductors 14, 15, 16 and so forth are completely covered by the plastic layer 30 except at the zones where the strips 31 overlie portions of the conductors 14, 15, 16 and so forth, as shown in FIGURE 4.

Figure 5:
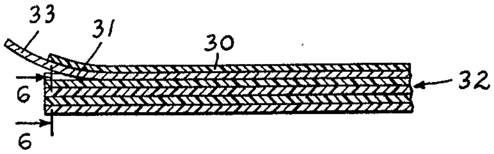
FIGURE 5 is a cross-sectional view showing the tear strip and overlying portion of the insulated layer being removed therefrom.
Figure 6:
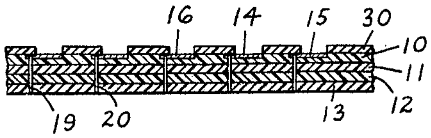
FIGURE 6 is an end elevational view of the circuit after removal of the tear strip.

After laminating, and as shown in FIGURE 5, the projecting ends 33 of the strips 31 are gripped and the strips are peeled from the stacked circuit 32, thereby removing narrow strips of the plastic layer 30 and exposing the portions of the conductors 14, 15, 16 and so forth, which were disposed beneath the strips 31 as shown in FIGURE 6. When thin metallic strips, such as thin copper, are used as the tear strips 31, clean edged grooves are formed in the plastic layer 30 and narrow sections of the conductors 14, 15 and 16 are bared, as shown in FIGURE 6.

Figure 7:
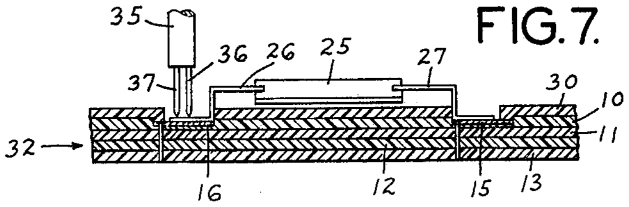
FIGURE 7 is an end elevational view on larger scale illustrating the connection of a module to the circuit.

Connections are made to the bared portions, as shown in FIGURE 7, by placing a component such as, for example, a module 25 with its terminal 26 and 27 in contact with the bared portions of the conductors 16 and 15, for example, and silver brazing them in position by means of a parallel gap welder 35 having a pair of closely spaced electrodes 36 and 37 through which a pulse of welding current can be passed to thereby heat a localized area of the terminal 26 and the conductor 16.

To facilitate brazing, the conductors 14, 15 and 16 may be provided with a coating of a brazing alloy or the terminals 26 and 27 may be provided with such brazing alloys or a thin strip of the brazing alloy may be interposed between the conductor 16 and the terminals 26 and 27. Upon passage of the welding current of about 10 to 20 amperes at a potential 0.1 to 0.8 volt for a very short period of time (almost instantaneously), that is, on the order of five to ten cycles of a sixty cycle current, the brazing alloy is melted and brazes the terminal to the conductor without any appreciable damage to the insulating medium adjacent thereto. A particularly effective way of treating the terminals 26 and 27 is shown in FIGURE 8. If the terminal 26, for example, is formed of Kovar, it brazes or solders with some difficulty and, moreover, has a tendency to break poorly soldered connections because of a different thermal-coefficient of expansion than the solder and the metal, e.g., copper, to which it is normally soldered. To overcome this defect, the end of the Kovar terminal may be clipped off and bimetallic strips of copper and a silver brazing alloy may be silver-brazed to the Kovar terminal with the copper away from the Kovar terminal and the silver adjacent the terminal to enable it to be brazed to the circuit conductor 16, for example, as shown in FIGURE 7. The use of a bimetallic strip on the terminals of other electrical components, such as, for example, the transistor 38 shown in FIGURE 1, is most advantageous for the reason that it assures a sound brazed connection between the transistor and the printed circuit without causing damage to the transistor itself, especially when the above-described brazing technique is used. The brazing heat while high (up to about 1400° F.) is developed over such a short period of time and in such a localized area that any residual heat is attenuated as it flows along the terminals and is insufficient when it reaches the transistor or the like to damage it, even without a heat sink.

The resulting product is a printed circuit or a stacked printed circuit which is completely encapsulated in an insulating medium except at the connection points and thus is not susceptible to short circuiting or other factors which would adversely affect the operation of the printed circuit. The process enables the production of extremely compact and complex circuits and electronic units with minimal spacing between the terminals and connections therein while at the same time avoiding inadvertent, unwanted interconnection of circuit portions which are closely adjacent to ecah other.

The process lends itself to more efficient and precise production of parts, readily inspected of the visible fillet formed by the brazing operation, and when brazed properly, a highly conductive connection which is at least as strong as or stronger than electrical conductors and terminals of the printed circuit and the terminals of the components because of the high strength of the silver brazing alloy.

It will be understood that the process by means of which portions of printed or similar circuits can be bared for making connections therewith is adapted to many different types of circuits and, accordingly, the form of the invention described herein should be considered as illustrative and not as limiting the invention, except as defined in the following claims.

We claim:

1. A method of making encapsulated electrical circuits comprising: forming a series of electrical conductors on at least one insulating support; superimposing at least one strip of metal on selected portions of said conductors; laminating a layer of insulating material to said electrical conductors, support and strip; stripping said strip and a portion of said insulating material laminated thereto from said conductors and support to expose said selected portions of said conductors, attaching a bimetallic strip to a terminal of an electrical component, one metal of said bimetallic strip being a silver brazing alloy; and brazing said bimetallic strip to a bared selected portion of said conductors.

2. A method of making encapsulated electrical circuits comprising: forming a series of electrical conductors on at least one insulating support; superimposing at least one strip of metal on selected portions of said conductors; laminating a layer of insulating material to said electrical conductors, support and strip; stripping said strip and a portion of said insulating material laminated thereto from said conductors and support to expose said selected portions of said conductors; attaching bimetallic strips of which one metal is a silver brazing alloy to terminals of an electrical component; and parallel gap brazing said bimetallic strips to bared selected portions of said conductors.

References Cited

UNITED STATES PATENTS

| | | | |
|---|---|---|---|
| 2,090,747 | 8/1937 | Charmoy. | |
| 2,133,863 | 10/1938 | Knoderer. | |
| 2,222,932 | 11/1940 | Bennett | 174—10 |
| 3,173,991 | 3/1965 | Breakfield. | |

JOHN F. CAMPBELL, Primary Examiner

R. W. CHURCH, Assistant Examiner

U.S. Cl. X.R.

29—621, 492, 628, 630, 577, 589; 156—3, 250; 174—10, 68.5; 204—15; 317—101; 339—17